United States Patent
Iizuka

[11] Patent Number: 5,332,073
[45] Date of Patent: Jul. 26, 1994

[54] SYSTEM FOR AND METHOD OF CONTROLLING LOCKUP CLUTCH

[75] Inventor: Naonori Iizuka, Fuji, Japan

[73] Assignee: JATCO Corporation, Fuji, Japan

[21] Appl. No.: 2,453

[22] Filed: Jan. 8, 1993

[30] Foreign Application Priority Data

Jan. 9, 1992 [JP] Japan .................................. 4-020606

[51] Int. Cl.⁵ .............................................. B60K 41/02
[52] U.S. Cl. .................................. 192/3.3; 192/0.075;
192/103 F; 477/87; 477/174
[58] Field of Search ...................... 192/3.3, 3.31, 3.29,
192/0.075, 0.052, 103 F, 103 R

[56] References Cited

U.S. PATENT DOCUMENTS

| | | | |
|---|---|---|---|
| 4,725,951 | 2/1988 | Niikura | 192/3.31 X |
| 4,760,902 | 8/1988 | Bellanger | 192/0.076 X |
| 4,825,991 | 5/1989 | Ohkuho | 192/0.052 |
| 4,880,094 | 11/1989 | Ohkumo | 192/0.052 |
| 5,060,158 | 10/1991 | Kono et al. | 192/0.076 X |
| 5,060,770 | 10/1991 | Hirano et al. | 192/0.076 X |
| 5,065,849 | 11/1991 | Kono et al. | 192/0.076 |
| 5,160,002 | 11/1992 | Suzuki | 192/3.31 |
| 5,160,003 | 11/1993 | Suzuki | 192/3.31 |

FOREIGN PATENT DOCUMENTS 63-172058  7/1988  Japan .

Primary Examiner—Leslie A. Braun
Assistant Examiner—Andrea Pitts
Attorney, Agent, or Firm—Foley & Lardner

[57] ABSTRACT

A control system for a lockup clutch measures an actual time required from start of engagement of the lockup clutch until completion of engagement of the lockup clutch, and sets a reference time required from start of engagement of the lockup clutch until completion of engagement of the lockup clutch. The system modifies a change rate of the duty ratio to the time so as to reduce a difference between the actual time and the reference time.

4 Claims, 2 Drawing Sheets

SYSTEM FOR AND METHOD OF CONTROLLING LOCKUP CLUTCH

BACKGROUND OF THE INVENTION

The present invention relates to a control system for a lockup clutch.

One of the prior art control systems for a lockup clutch is disclosed, for example, in JP 63-172058. This control system for a lockup clutch is so constructed that an operating state of a lockup clutch is controlled by a solenoid having a duty ratio controlled. In order to prevent the engagement time of the lockup clutch from varying by oil temperature, vehicular speed, engine load, etc., the hydraulic pressure characteristic upon engagement of the lockup clutch is changed in response to an oil temperature signal, a vehicular speed signal, an engine load signal, etc. By way of example, due to the fact that the engagement time of the lockup clutch upon large engine load is longer than that upon small engine load, the hydraulic pressure characteristic upon engagement is changed quickly to prevent variation in the engagement time.

As to such a prior art control system for a lockup clutch, however, even if the hydraulic pressure characteristic upon engagement is adequately determined in accordance with oil temperature, vehicular speed, engine load, etc., the time required for engagement of the lockup clutch may vary due to a secular change of a friction characteristic of a clutch facing, a friction coefficient of hydraulic fluid, etc. Moreover, due to dispersion of engine output torque, etc., among units, it is impossible to unify the engagement characteristic of the lockup clutch all transmissions.

It is, therefore, an object of the present invention to provide a control system for a lockup clutch which is capable of making constant the engagement characteristic of a lockup clutch even with a secular change of friction characteristic of a clutch facing, friction coefficient of hydraulic fluid, etc.

SUMMARY OF THE INVENTION

According to one aspect of the present invention, there is provided a method of controlling a lockup clutch, the lockup clutch allowing connection of a pump impeller side with a turbine runner side in a hydraulic power transmission, the lockup clutch being controlled by a solenoid having a duty ratio controlled, upon engagement of the lockup clutch the duty ratio of the solenoid being changed continuously and in accordance with a time by a control means, the method comprising the steps of:

measuring an actual time required from a start of engagement of the lockup clutch until a completion of engagement of the lockup clutch and generating an actual time indicative signal indicative of said actual time measured;

setting a reference time required from said start of engagement of the lockup clutch until said completion of engagement of the lockup clutch and generating a reference time indicative signal indicative of said reference time set; and modifying a change rate of the duty ratio to the time so as to reduce a difference between said actual time indicative signal and said reference time indicative signal.

According to another aspect of the present invention, there is provided a system for controlling a lockup clutch, the lockup clutch allowing connection of a pump impeller side with a turbine runner side in a hydraulic power transmission, the lockup clutch being controlled by a solenoid having a duty ratio controlled, upon engagement of the lockup clutch the duty ratio of the solenoid being changed continuously and in accordance with a time by a control means, the control system comprising:

means for measuring an actual time required from a start of engagement of the lockup clutch until a completion of engagement of the lockup clutch and generating an actual time indicative signal indicative of said actual time measured;

means for setting a reference time required from said start of engagement of the lockup clutch until said completion of engagement of the lockup clutch and generating a reference time indicative signal indicative of said reference time set; and means for modifying a change rate of the duty ratio to the time so as to reduce a difference between said actual time indicative signal and said reference time indicative signal.

DETAILED DESCRIPTION OF THE INVENTION

Figure 1:
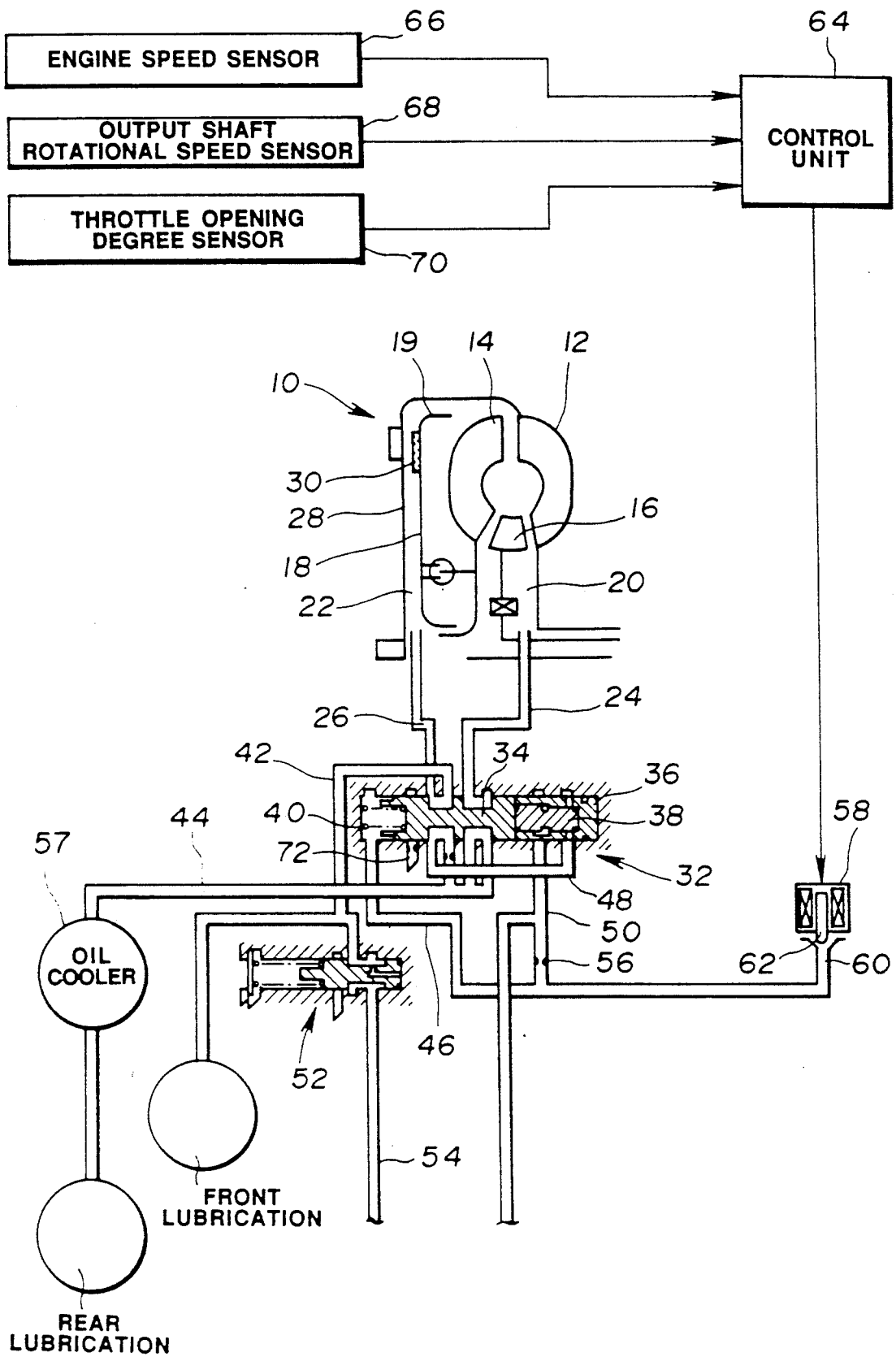
FIG. 1 is a schematic drawing showing a preferred embodiment of a control system for a lockup clutch according to the present invention.

Referring first to FIG. 1, a torque converter 10 includes, in addition to a pump impeller 12, a turbine runner 14, a stator 16, a lockup clutch 18. An apply chamber 20 wherein the pump impeller 12, turbine runner 14, etc. are disposed is formed on the right of the lockup clutch 18 as viewed in FIG. 1, whereas a release chamber 22 is formed on the left of the lockup clutch 18 as viewed in FIG. 1. A hydraulic passage 20 is connected to the apply chamber 20, whereas a hydraulic passage 26 is connected to the release chamber 22. The lockup clutch 18 has a facing 30 which comes in contact with a frictional surface of a cover 28 of the torque converter 10. Supply of hydraulic pressure to the hydraulic passages 24, 26 is controlled by a lockup control valve 32 which includes a spool 34, a sleeve 36, a plug 38, and a spring 40. Additionally, the lockup control valve 32 is connected, in addition to the hydraulic passages 24, 26, to hydraulic passages 42, 44, 46, 48, 50 as shown in FIG. 1.

The hydraulic passage 42 is supplied with constant hydraulic pressure from a torque converter relief valve 52 which carries out pressure regulation by using hydraulic pressure within a hydraulic passage 54 which receives hydraulic pressure from a pressure regulator valve (not shown). The hydraulic passage 44 is connected to an hydraulic fluid cooler 57, hydraulic fluid flowing therefrom being used for lubrication. The hydraulic passage 50 is supplied with constant hydraulic pressure regulated from a pressure regulator valve (not shown). The hydraulic passage 46 diverged from the hydraulic passage 50 through an orifice 56 is connected to a lockup solenoid 58.

The lockup solenoid 58 provides a plunger 62 which opens an opening 60 of the hydraulic passage 46 when no power is supplied, a live state of the lockup solenoid 58 being controlled in duty ratio by a signal derived from a control unit 64. Specifically, the lockup solenoid 58 is repeatedly turned on and off at a predetermined period of time, and opens the opening 60 in accordance with the ratio of the ON time, thereby regulating hydraulic pressure within the hydraulic passage 46 to be in inverse proportion to the ON time. The control unit 64 inputs signals from an engine speed sensor 66, a speed sensor 68, and a throttle opening degree sensor 70 so as to control the operation of the lockup solenoid 58 which will be described hereinafter.

Next, the operation of this embodiment will be described. A release state of the lockup clutch 18 is obtained as follows: The duty ratio of the lockup solenoid 58 is set to zero so that the opening 60 is fully closed by the plunger 62. As a result, the hydraulic passage 46 undergoes the same hydraulic pressure as the hydraulic passage 50, which acts on a left end of the spool 34 of the lockup control valve 32. Thus, the spool 34 takes a state as illustrated in FIG. 1, so that hydraulic pressure within the hydraulic passage 42 is supplied to the release chamber 22 via the hydraulic passage 26. Hydraulic pressure within the release chamber 22 flows into the apply chamber 20 through a clearance between the frictional surface of the cover 28 and the facing 30, then it is returned to the lockup control valve 32 via the hydraulic passage 24, and discharged into the hydraulic passage 44.

That is, hydraulic pressure is supplied from the hydraulic passage 26 to the release chamber 22, then discharged to the hydraulic passage 24 via the apply chamber 20. As a result, hydraulic pressure within the release chamber 22 becomes equal to that one within the apply chamber 20 (Strictly, passage loss causes the apply chamber 20 to have slightly lower hydraulic pressure since the apply chamber 20 is located downstream), so that the lockup clutch 18 becomes in a release state. That is, the torque converter 10 is in a torque converter state wherein torque is transmitted only through hydraulic fluid.

When gradually engaging the lockup clutch 18 from the above state, the following operation is carried out: With a gradual increase in the duty ratio which the control unit 64 provides to the lockup solenoid 58, hydraulic fluid is discharged from the opening 60 in accordance with this, decreasing hydraulic pressure within the hydraulic passage 46. As a result, the left end of the spool 34 of the lockup control valve 32 undergoes decreased hydraulic pressure, causing leftward movement of the spool 34 and the plug 38 as viewed in FIG. 1. When the spool 34 and the plug 38 are urged to move leftward by a predetermined amount, the hydraulic passage 26 slightly communicates with a drain port, whereas the hydraulic passage 42 communicates with the hydraulic passage 24.

Since hydraulic pressure within the hydraulic passage 26 is fed back to a right end of the plug 38 via the hydraulic passage 48, the lockup control valve 32 will be in a pressure regulation state, so that hydraulic pressure within the hydraulic passage 26 is regulated in accordance with hydraulic pressure which the left end of the spool 34 undergoes from the hydraulic passage 46. That is, in this state, in the torque converter 10, hydraulic pressure is supplied to the apply chamber 20 from the hydraulic passage 24.

Hydraulic pressure within the apply chamber 20 flows into the release chamber 22 through a clearance between the lockup clutch 18 and the cover 28, then it is discharged into the hydraulic passage 26. Hydraulic pressure within the hydraulic passage 26 is controlled by that one within the hydraulic passage 46, i.e., hydraulic pressure to be regulated in inverse proportion to the duty ratio of the lockup solenoid 58. Since the release chamber 20, the facing 30 of the lockup clutch 18 is pressed to the frictional surface of the cover 28. This force for pressing the lockup clutch 18 is controlled by the lockup solenoid 58 as described above.

When such transitional slip control of the lockup clutch 18 is completed, the duty ratio of the lockup clutch 58 is set to 100% to fully open the opening 60. As a result, hydraulic pressure within the hydraulic passage 46 becomes zero, so that the spool 34 is fully switched leftward as viewed in FIG. 1. In this state, hydraulic pressure is supplied to the apply chamber 20 from the hydraulic passage 24 so as to fully engage the lockup clutch 18, having little hydraulic fluid flow to the hydraulic passage 26.

Figure 2:
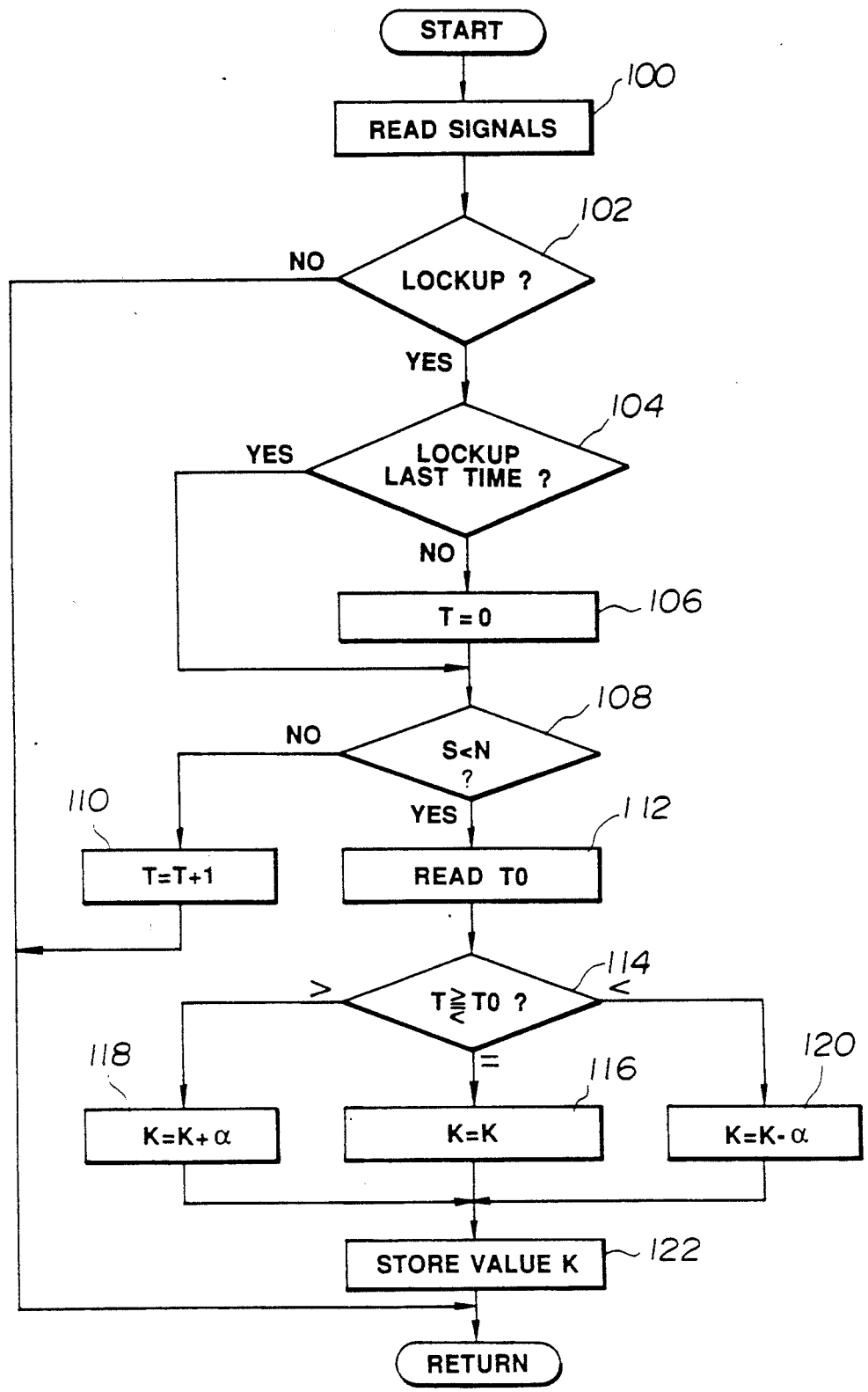
FIG. 2 is a flowchart showing the operation of the control system.

Referring to FIG. 2, engagement of the lockup clutch 18 is carried out in accordance with a control flow as shown in FIG. 2.

First, at a step 100, signals are read from the throttle opening degree sensor 70 and the output shaft rotational speed sensor 68. Then, at a step 102, it is determined, based on the signals as read, whether or not engine load and vehicular speed are in a condition wherein the lockup clutch 18 is to be engaged. If the answer at the step 102 is NO, the routine is returned, whereas if the answer is YES, the routine proceeds to a step 104.

At the step 104, it is determined whether or not engine load and vehicular speed were in engagement condition in the previous routine. If the answer at the step 104 is YES, the routine proceeds to a step 108, whereas if the answer is NO, the routine proceeds to a step 106 wherein a timer T is set to zero, then it proceeds to the step 108. It is to be noted that the timer T indicates an actual time required for engagement of the lockup clutch 18.

At the step 108, it is determined whether or not a slip amount S of the lockup clutch 18 is smaller than a predetermined value N. It is to be noted that the slip amount S is a difference between engine speed and rotational speed of the turbine runner 14 as calculated based on vehicular speed, and that the predetermined value N is a small value at which the lockup clutch 18 is judged to be in engagement.

If, at the step 108, the slip amount S is greater than N, the routine proceeds to a step 110 wherein a new value of T is set by adding T to 1 (T=T+1), then the routine is returned. On the other hand, if the slip amount S is smaller than N, i.e., it is determined that the lockup clutch 18 is engaged, the routine proceeds to a step 112 wherein a reference time T0 is read. It is to be noted that a value of the reference time T0 is previously set in accordance with oil temperature, engine load, and vehicular speed. A value of T0 becomes smaller with an increase in oil temperature, smaller with an increase in throttle opening degree, and smaller with an increase in vehicular speed.

At a subsequent step 114, the actual time T is compared with the reference time T0. If T is equal to T0, the routine proceeds to a step 116 wherein a value of K fails to be changed. If T is greater than T0, the routine proceeds to a step 118 wherein a new value of K is set by adding K to $\alpha$ (K=K+$\alpha$), whereas if T is smaller than T0, the routine proceeds to a step 120 wherein a new value of K is set by subtracting $\alpha$ from K. At a subsequent step 122, a value of K is stored, then the routine is returned. It is to be noted that K is a value indicative of the change rate of the duty ratio to the time during engagement of the lockup clutch 18. With an increase in K, the magnitude of a change in the duty ratio becomes larger, obtaining a more quick change in hydraulic pressure within the release chamber 22.

In brief, according to the above control, when the actual time T required for engagement of the lockup clutch 18 after becoming in condition wherein the lockup clutch 18 is to be engaged is greater than the reference time TO, a value of K is larger, obtaining the larger magnitude of a change in the duty ratio, resulting in the shortened engagement time during next engagement of the lockup clutch 18. On The other hand, when the actual time T is smaller than the reference time TO, a value of K is smaller, obtaining the smaller magnitude of a change in the duty ratio, resulting in the lengthened engagement time during next engagement of the lockup clutch 18. Therefore, control is carried out so that the actual time T always corresponds to the reference time TO. As a result, even if friction characteristic of the facing 30, friction coefficient of hydraulic fluid, etc., vary due to a secular change, the time required for engagement of the lockup clutch 18 is always kept constant. This prevents occurrences of great engagement shock of the lockup clutch 18, and seizure of the facing 30.

Having described the present invention in connection with the above embodiment, it is to be noted that various changes and modifications may be made in the present invention. By way of example, in the above embodiment, completion of engagement of the lockup clutch 18 is determined based on the slip amount S, alternatively, it may be determined based on the fact that the duty ratio to be provided to the lockup solenoid 58 is greater than a predetermined value.

Further, in the above embodiment, a value of K is modified upon all engagement operation of the lockup clutch 18, alternatively, it may be modified only upon engagement of the lockup clutch 18 in the particular cases which are, for example, a case that a change in engine load is small, or that a change in engine speed is small, or that a change vehicular speed is small during engagement of the lockup clutch 18, a case engine speed and turbine rotational speed are within a predetermined range, and a case that shift fails to carried out simultaneously with engagement of the lockup clutch 18.

What is claimed is:

1. A method of controlling a lockup clutch, the lockup clutch allowing connection of a pump impeller side with a turbine runner side in a hydraulic power transmission, the lockup clutch being controlled by a solenoid having a duty ratio which, upon engagement of the lockup clutch, is changed continuously and in accordance with a time by a control means, the method comprising the steps of:

measuring an actual time required from a start of engagement of the lockup clutch until a completion of engagement of the lockup clutch and generating an actual time indicative signal indicative of said actual time measured;

setting a reference time required from said start of engagement of the lockup clutch until said completion of engagement of the lockup clutch and generating a reference time indicative signal indicative of said reference time set; and modifying a change rate of the duty ratio so as to reduce a difference between said actual time indicative signal and said reference time indicative signal.

2. A method as claimed in claim 1, wherein said reference time is determined by at least one of an oil temperature, a vehicular speed, and an engine load.

3. A system for controlling a lockup clutch, the lockup clutch allowing connection of a pump impeller side with a turbine runner side in a hydraulic power transmission, the lockup clutch being controlled by a solenoid having a duty ratio which, upon engagement of the lockup clutch, is changed continuously and in accordance with a time by a control means, the control system comprising:

means for measuring an actual time required from a start of engagement of the lockup clutch until a completion of engagement of the lockup clutch and generating an actual time indicative signal indicative of said actual time measured;

means for setting a reference time required from said start of engagement of the lockup clutch until said completion of engagement of the lockup clutch and generating a reference time indicative signal indicative of said reference time set; and means for modifying a change rate of the duty ratio so as to reduce a difference between said actual time indicative signal and said reference time indicative signal.

4. A system as claimed in claim 3, wherein said reference time is determined by at least one of an oil temperature, a vehicular speed, and an engine load.

* * * * *